(12) United States Patent
Rafey et al.

(10) Patent No.: US 6,940,538 B2
(45) Date of Patent: Sep. 6, 2005

(54) EXTRACTING A DEPTH MAP FROM KNOWN CAMERA AND MODEL TRACKING DATA

(75) Inventors: Richter A. Rafey, Santa Clara, CA (US); Peter Broadwell, Palo Alto, CA (US); Sidney Wang, Pleasanton, CA (US); Simon Gibbs, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 637 days.

(21) Appl. No.: 09/942,806

(22) Filed: Aug. 29, 2001

(65) Prior Publication Data

US 2003/0043270 A1 Mar. 6, 2003

(51) Int. Cl.[7] .................................................. H04N 7/18
(52) U.S. Cl. .......................................... 348/157; 348/51
(58) Field of Search ............................ 348/46, 42, 51, 348/580, 157; 382/154, 285; 345/419, 757, 848, 850, 629; 463/5–6

(56) References Cited

U.S. PATENT DOCUMENTS

| | | | |
|---|---|---|---|
| 5,600,368 A | 2/1997 | Matthews, III | |
| 5,729,471 A | 3/1998 | Jain et al. | |
| 5,742,521 A | 4/1998 | Ellenby et al. | |
| 5,745,126 A | 4/1998 | Jain et al. | |
| 5,860,862 A * | 1/1999 | Junkin | 463/40 |
| 6,031,545 A | 2/2000 | Ellenby et al. | |
| 6,072,504 A * | 6/2000 | Segen | 345/474 |
| 6,080,063 A | 6/2000 | Khosla | |
| 6,193,610 B1 | 2/2001 | Junkin | |
| 6,445,815 B1 * | 9/2002 | Sato | 382/154 |
| 6,466,250 B1 * | 10/2002 | Hein et al. | 348/14.16 |
| 6,535,226 B1 * | 3/2003 | Sorokin et al. | 345/723 |
| 6,674,461 B1 * | 1/2004 | Klapman | 348/42 |
| 6,741,241 B1 * | 5/2004 | Jaubert et al. | 345/419 |
| 6,860,806 B2 * | 3/2005 | Kojima et al. | 463/6 |
| 2001/0003715 A1 * | 6/2001 | Jutzi et al. | 463/40 |
| 2001/0023202 A1 * | 9/2001 | Okubo | 463/35 |
| 2002/0069265 A1 | 6/2002 | Bountour et al. | |

* cited by examiner

*Primary Examiner*—Vu Le
(74) *Attorney, Agent, or Firm*—Blakely, Sokoloff, Taylor & Zafman LLP (57) ABSTRACT

A method of extracting a depth map from known camera and tracking data. The method includes the steps of positioning a virtual camera at the coordinates of the tracked camera, setting the field of view to that of the tracked camera, positioning and orienting a synthetic tracked object to the coordinates of the tracked object, clearing the depth buffer and rendering the tracked object as a depth map.

31 Claims, 6 Drawing Sheets

EXTRACTING A DEPTH MAP FROM KNOWN CAMERA AND MODEL TRACKING DATA

FIELD OF THE INVENTION

The invention relates generally to the augmenting of video signal content with supplemental data source components.

BACKGROUND

As broadcast television becomes increasingly sophisticated by augmenting content based on supplemental data sources and camera tracking technology, there is a general desire to open up the possibilities for visual enhancements. Virtual set and movie special effects technology is leading to advanced camera tracking techniques that facilitate the integration of synthetic environments into live video by adapting the synthetic content to camera data (e.g. position, orientation, field of view). Thus the instrumentation of cameras for precise tracking is advancing.

Existing technologies such as the new Zcam camera (Zcam is a trademark of 3DV Systems, Ltd.) are beginning to illustrate how depth information can become a first class data source for fusing synthetic content with video. Unfortunately Zcam and other methods of depth extraction (such as image disparity) are currently constrained to a limited volume for acquisition of depth information. The typical acquisition range of such technologies varies from a few square meters up to a volume commensurate to that of an indoor studio. The quality of depth reconstruction provided by such systems diminishes as it scales up. Thus these solutions do not scale up to levels where they can be applied to sports venues such as stadiums and racetracks.

SUMMARY OF THE INVENTION

A method of extracting a depth map using camera and object tracking data is disclosed. In one embodiment, the method includes positioning a virtual camera at the coordinates of the tracked camera, setting the field of view to that of the tracked camera, positioning and orienting a model of the tracked object to the coordinates of the tracked object, clearing the depth buffer, rendering the model as a depth map and distorting the depth buffer. In one embodiment, the depth map may then be used to placed virtual objects into video as imagery of the tracked camera.

DETAILED DESCRIPTION

In the following description, for purposes of explanation, numerous details are set forth in order to provide an understanding of the present invention. However, it will be apparent to one skilled in the art that these specific details are not required to practice the present invention. The invention is described in the context of integrating a virtual object, for example, a race car or football player, into a live video environment, for example, a car race or football game. It is readily apparent that the present invention is not limited to live video as the invention is readily applicable to any imaging media and media signals. Furthermore, the present invention is applicable to a wide variety of venues including sporting events.

In addition, for purposes of discussion herein, the following terms will be used. A synthetic object is a computer or digital signal representation of a real object. A synthetic object may be generated a number of ways including digitally translating or digitally capturing an image or images. A tracked object is a real object having sensors that provide information regarding the object including position and orientation. A virtual object is, for example, a computer generated object that does not exist as a real object.

Figure 1A:
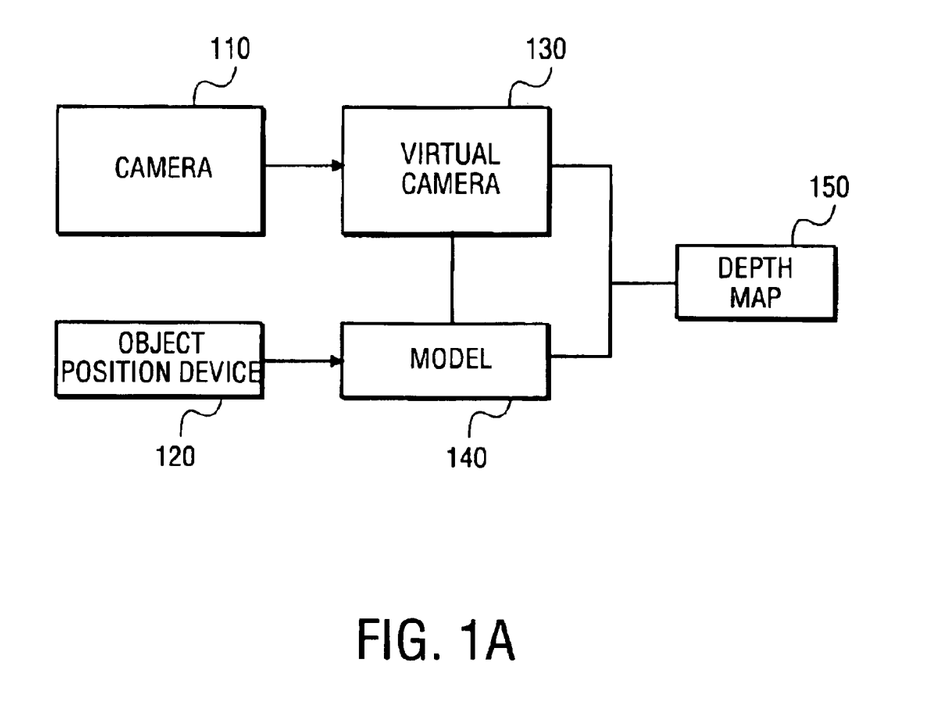
FIG. 1a is a simplified block diagram of one embodiment of the system of the present invention.

One embodiment of the system is illustrated by the simplified block diagram of FIG. 1a. A tracked camera 110 is used to supply camera data for the virtual camera 130, for example, information to define a viewpoint for the synthetic scene. The field of view of the camera 110 is also used to define the field of view for the virtual camera 130. A tracked object's position, for example, the position of a racecar, is determined by object position device 120. In one embodiment, the position is determined using a Global Positioning System (GPS) receiver. Other position-determining devices may also be used. For example, a combination of GPS and image-based orientation could be used. The position of the tracked object is used to position a synthetic tracked object, for example, a computer generated model. From this information a depth map 150 can be generated. This information may also be used to perform manual or automatic feature extraction from video.

Figure 1B:
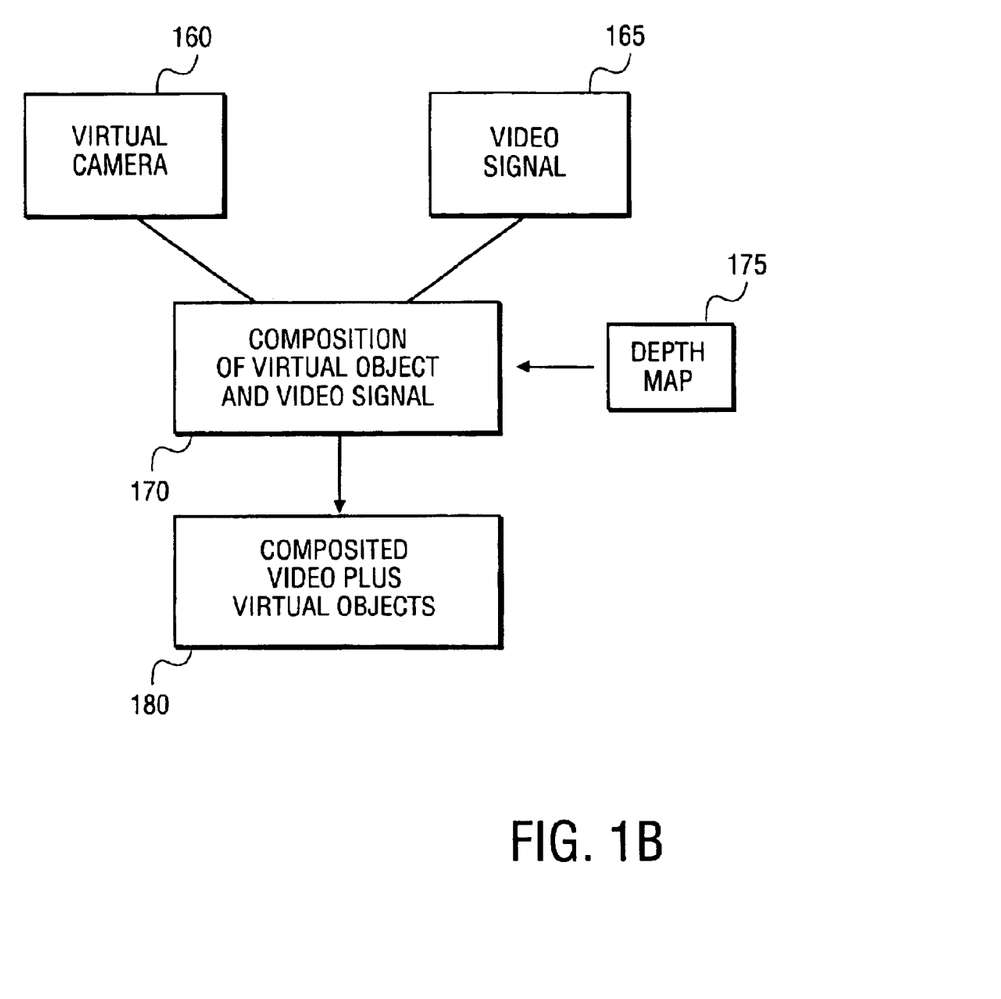
FIG. 1b is a simplified block diagram of a system utilizing one embodiment of the present invention.

The system and method of the present invention provides for the extracting of a depth map from camera data and object tracking data. Embodiments of the system and method of the present invention further provide for rendering a virtual object in a live image environment using the extracted depth map. This is illustrated by the simplified block diagram of FIG. 1b. A virtual object 160 (or virtual objects) are combined 170 or composited with video signal 165. The depth map 175 is used to determine which portion (or portions) of a virtual object is in from of or behind the video signal image. Typically, this process is performed for each pixel such that the composited image 180 will contain pixels representative of the synthetic object or scene or virtual object located at the front of the composited image depending upon the depth value in the extracted depth map.

Figure 2A:
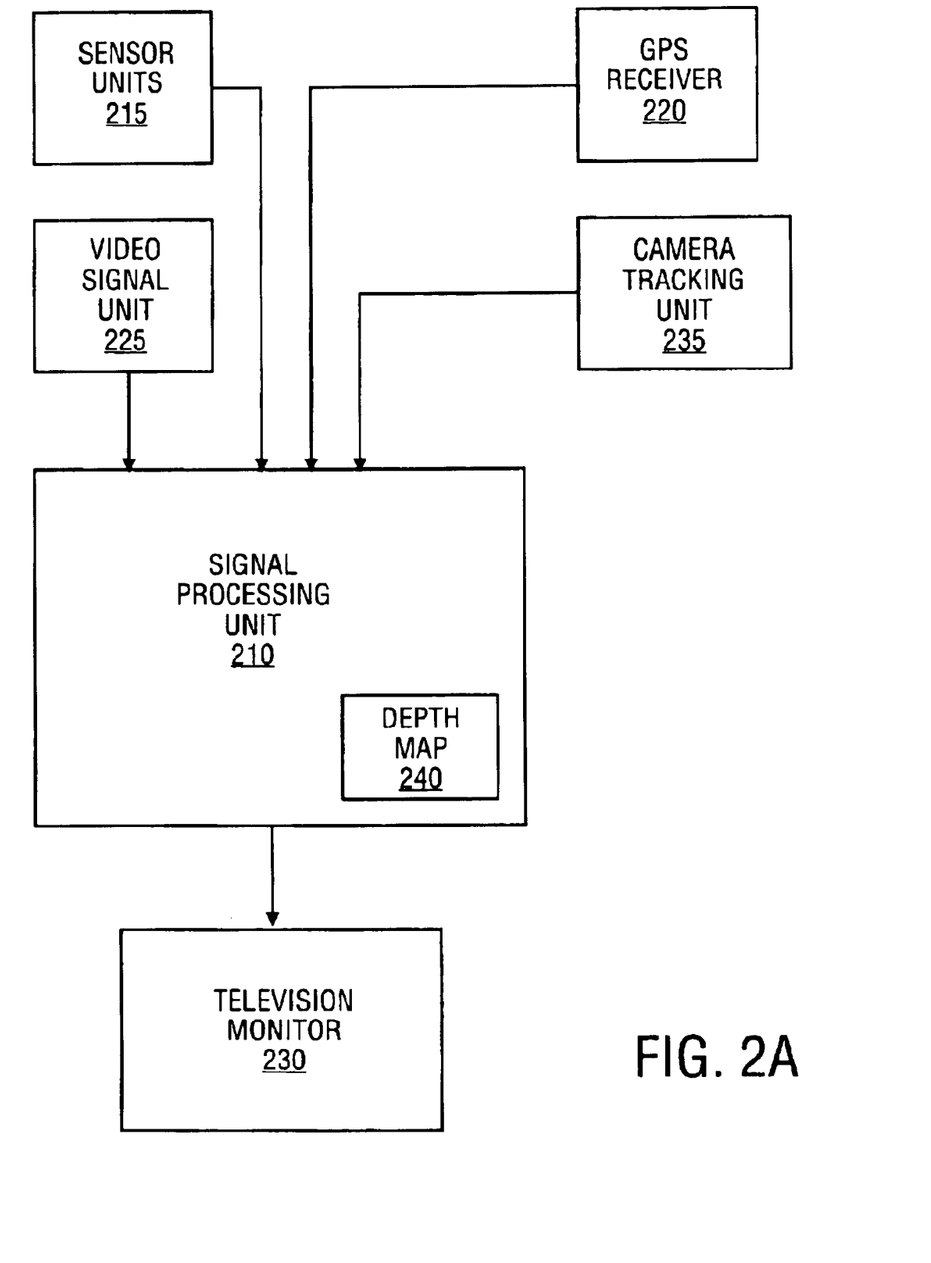
FIG. 2a shows a simplified diagram of one embodiment of the system architecture of the present invention.

A simplified block diagram of one embodiment of an exemplary system which combines the depth map extraction process described herein with the virtual object video compositing process is illustrated in FIG. 2a. Referring to FIG. 2a, the system includes, global positioning system (GPS) receiver 220, camera tracking unit 235, sensor unit 215, video signal unit 225, signal processing unit 210 and television monitor 230.

The signal processing unit 210 receives sensor data from sensor units 215, position and orientation data from GPS receiver 220, video data from video signal unit 225 and camera data from camera tracking unit 235. As discussed below, the signal processing unit 210 processes the data streams, to produce at least one synthetic camera view and at least one position and orientation of a synthetic object. The camera viewpoint and synthetic object information are combined to generate a depth map 240 that can be used to produce a video output for display on a display device, such as a computer monitor or television monitor 230.

Sensor unit 215 provides sensor data with respect to live objects or backgrounds of interest from desired view positions and angles. These sensor units are placed in a manner that will facilitate the complementing of sports broadcasting with synthetic camera shots. In one embodiment, the sensor data is used to facilitate the generation of the synthetic views which may be, in one embodiment, realistic computer generated graphics images. Examples of sensor data include position of limbs of a player, weather and/or lighting conditions.

GPS receiver 220 generates position and orientation data for each object having a co-located GPS receiver 220. This data indicates where particular objects, such as players or cars are in space by providing position and orientation data of objects of interest.

Camera tracking unit 235 provides camera tracking data. This data facilitates the integration of synthetic environments (e.g., synthetic objects or backgrounds) into video by using camera data to render the synthetic content using the camera data reflective of the video environment. By registering position information, for example, 3D-position information, of the synthetic environments in space with the camera data, it is possible to render a synthetic version of a known object. The camera tracking equipment that provides the camera data is known in the art and typically uses encoders to read the current pan, tilt, and twist of the camera, as well as, the zoom level, i.e., the field of view. Furthermore, the position of the camera if fixed, is measured, for example, using survey methods, or may be tracked if mobile. As explained below, the camera data is used to reproduce a virtual camera that corresponds to the real camera.

The audio-visual signal from video signal unit 225 may be generated by a variety of sources including by a live broadcast. In such an embodiment, the data content is determined by the broadcaster. This signal is transmitted to the signal-processing unit 210 for integration with the other data streams mentioned earlier.

Figure 2B:
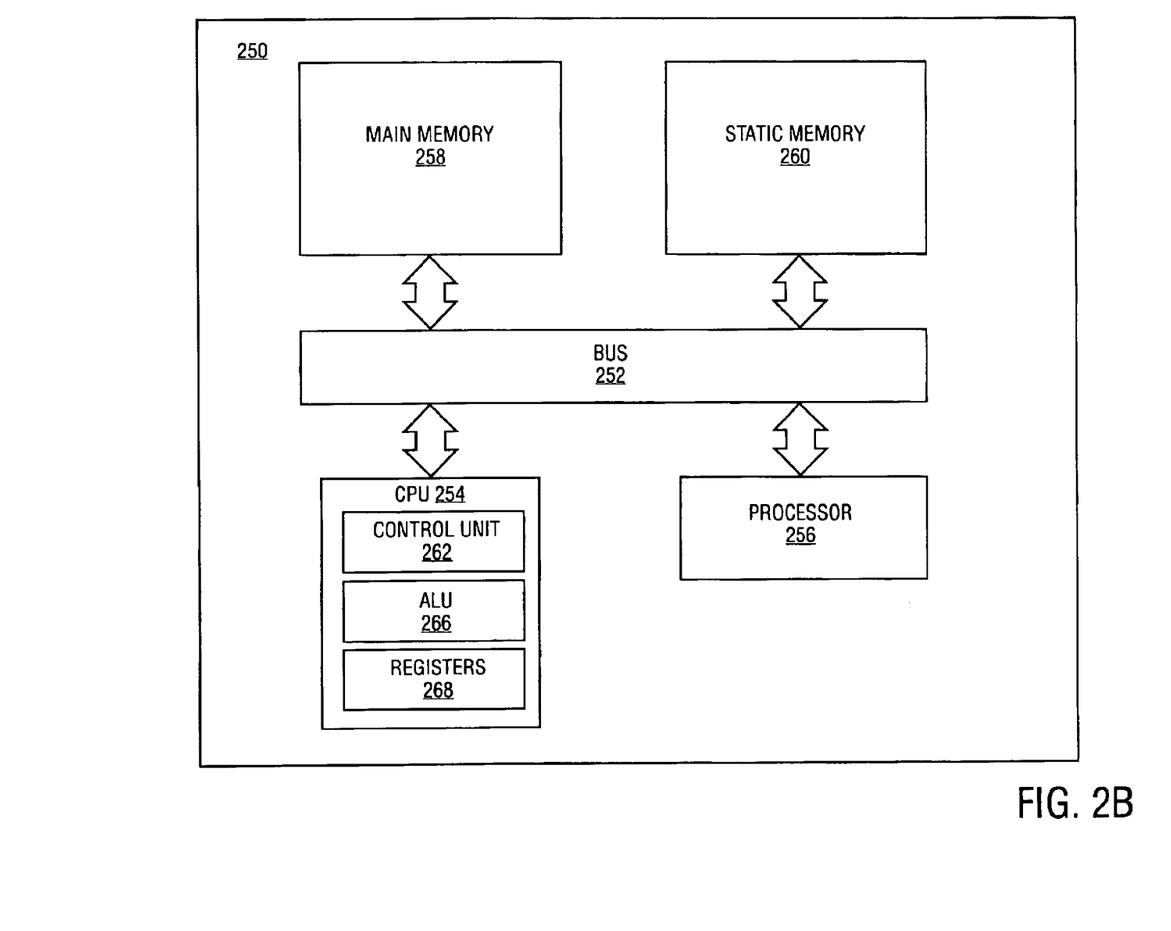
FIG. 2b illustrates an exemplary processing system in accordance with one embodiment of the present invention.

FIG. 2b depicts an exemplary processing system 250 that operates in accordance with the teachings of the present invention. The processes described herein, in one embodiment, may be implemented based on a general processing architecture. Referring to FIG. 2b, digital processing system 250 includes a bus 252 or other communications means for communicating information. CPU 254 in one embodiment, includes a control unit 262, an arithmetic logic unit (ALU) 266, and several registers 266. For example registers 268 may include predicate registers, spill and fill registers, loading point registers, integer registers, general registers, and other like registers. In one embodiment, CPU 254 is used to implement the processes described herein. Furthermore, another processor 256 such as, for example, a coprocessor, can be coupled to bus 252 for additional processing power and speed.

Processing system 250 also includes a main memory 258, which may be a Random Access Memory (RAM) or some other dynamic storage device that is coupled to bus 252. Main memory 258 may store information and instructions to be executed by CPU 254 including data describing the virtual camera, the model of the tracked object, camera data and the depth buffer. Main memory 258 may also store temporary variables or other intermediate information during execution of instructions by CPU 254. Digital processing system 250 may also include a static memory 260 such as, for example, a Read Only Memory (ROM)/or other static source device that is coupled to bus 252 for storing static information and instructions for CPU 254. A mass storage device (not shown), which may be a hard or floppy disk drive, can also be coupled to bus 252 for storing information and instructions.

The processes described herein may be implemented as computer readable instructions which are provided to a processor such as the processing system 200. These instructions are stored on and transferred over a computer readable medium and direct the processor to implement a series of commands that correspond to the processes herein described.

In one embodiment of the present invention, the position and orientation information of a real object used in conjunction with camera tracking data produces a synthetic object. This synthetic object is rendered to a depth map. The depth map captures the relative distance of the synthetic object from the view of a particular camera. In one embodiment of the system of the present invention, it is derived by reconstructing a virtual view with known 3D synthetic objects and position and camera tracking data. Camera tracking data provides enough data to very accurately emulate the real camera view in a virtual rendering.

Figure 3A:
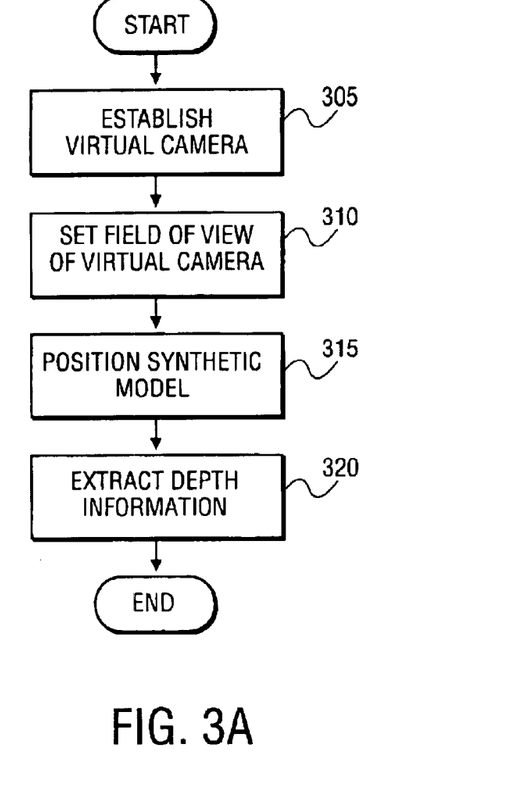
FIGS. 3a and 3b illustrate embodiments of processes of the present invention.

One embodiment of the process is illustrated by the simplified flow diagram of FIG. 3a. At step 305 a virtual camera is established. In one embodiment, camera data from a camera filming (referred to herein in this embodiment as a live camera), for example a camera filming an auto race, consisting typically of position and orientation information, is used to establish the position, orientation etc. of the virtual camera. Thus the live camera data defines a viewpoint for the virtual camera in the synthetic scene. In one embodiment, the motion of the camera may then be used to drive the motion of the virtual camera.

At step 310, the field of view of the virtual camera is set to that of the live camera and at step 315 the synthetic object is positioned. In one embodiment, the synthetic object is a three dimensional graphic generated representation of a real object, such as a racing car using the example discussed herein. The synthetic object is positioned in the synthetic environment in accordance with the virtual camera. At step 320, the depth map can be extracted from the synthetic environment. The extracted depth map defines the depths of the synthetic images in the synthetic environment. The extracted depth map may be used for a variety of purposes. For example, the depth map may be used to combine synthetically generated object(s) with the moving images (e.g. video, including live video).

Figure 3B:
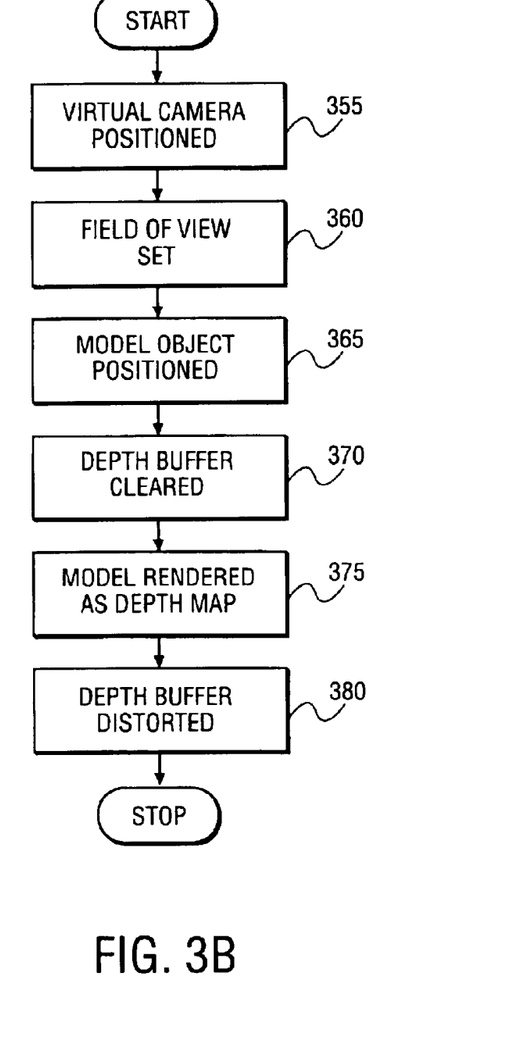

FIG. 3b illustrates an exemplary process of one embodiment of the present invention. Referring to FIG. 3b, at step 355 the virtual camera is positioned at the coordinates/orientation of the tracked camera. This information imparts to the virtual view an orientation that is analogous to that of the view generated by the tracked camera. The virtual camera coordinates/orientation thus obtained are used to render the synthetic objects from the view of the virtual camera.

At step 360, the field of view of the virtual camera is set to the field of view of the tracked camera. This step gives the virtual camera a field of view corresponding to that of the tracked camera.

At step 365, the position and orientation of the synthetic object is positioned to the coordinates and orientation of the real object that is being tracked. This step gives the synthetic object a position and orientation corresponding to that of the real object.

At step 370 the depth buffer is cleared. This frees the depth buffer so that the model of the tracked object will determine the content of the buffer. In one embodiment, the depth buffer is cleared for each frame of video subsequently combined with the synthetically generated data.

At step 375 the tracked synthetic object and the synthetic environment it is in is rendered to the depth buffer. This model is rendered to the depth buffer as a depth map. The reconstructed data upon which this depth map is based allows the capturing of the relative distances of objects from the view of a particular camera.

At step 380 the data in the depth buffer is distorted to simulate distortion effects produced by camera lenses. In one embodiment, this is accomplished by copying the contents of the depth buffer to a texture on a grid, distorting the grid coordinates and rendering the grid to a depth buffer. The depth buffer is then distorted using the radial distortion coefficient/optical center shift of the tracked camera, thereby completing the process.

Since the images generated are a construction or virtual reconstruction, the resolution of the images are arbitrary and not constrained by video resolution, but in practice, since it is ultimately fused with video data, it will typically be processed at video resolution. The depth map can be used to compute occlusion with a graphic system, using techniques known in the art, but in large-scale venues. Computing the depth information can be done in real time, as it is simpler than traditional rendering, because lighting and other visual enhancements are not required to produce a depth map.

For example, processes executed in accordance with one embodiment of the invention may be used to create a depth map for use in generating virtual or synthetic views of an auto racing broadcast. The depth map generated can facilitate the insertion of graphics objects into video images with proper occlusion so that the inserted graphics seamlessly integrate in with the video images displayed in the racing broadcast. For instance, to show a viewer-controlled virtual car racing against the live racers on a networked home game console or in a sports bar. The viewer would be able to observe his performance as if he was in the live race. An example of one embodiment is explained below in the context of an auto racing broadcast that is enhanced by the integration of virtual car images using the process.

The virtual camera is positioned at coordinates/orientation of a tracked camera. Some cameras on the market today are instrumented to enable real-time tracking of their position and orientation. This camera data can serve as a feed for data packets to the device that is doing the graphics generation of synthetic environments. The device doing the graphics generation may begin with a geographically registered 3D model of the same track ("virtual track") where the race is taking place. The live camera data defines a viewpoint for the camera in the synthetic scene. This enables the motion of the camera at the race to drive the motion of the camera that is used to render the virtual track.

The field of view is set to that of the tracked camera. Among other camera parameters in the data packet, the virtual camera replicates the field of view so that the viewing frustum for the virtual scene maps precisely to that of the live camera. This enables the edges of the rendered scene to correspond to the edges of the video from the tracked camera.

The position/orientation of the synthetic object of the tracked real object is positioned/oriented to coordinates/orientation of the tracked real object. For example, using GPS (Global Positioning System) sensors on each car in the race, a 3D synthetic object of the associated car is placed in the scene and animated based on the derived sensor data. The derived sensor data is transmitted in data packet form. Orientation may also be based on the tracked real object, if the GPS data doesn't provide sufficient data, using the geometric normal of the part of the tracked real object where the car is located. This may be accomplished because the track model has a fixed inclination. Additionally, steering wheel data may be used to properly orient the tires to the rest of the car because the tires rotate based on steering.

Ultimately the synthetic scene is rendered into a depth buffer that will have a numeric value for every pixel reflecting normalized depth information relative to the camera being used to render the scene (that being tracked). In one embodiment, to support dynamic depth tracking, the depth buffer is initialized as empty for each frame that is rendered.

The synthetic tracked object is rendered as a depth map into depth buffer. The synthetic content (car model and track model) may be rendered into a depth map that rather than being a visually accurate image of the track is just the normalized depth value for each pixel of the image. This may be used as an auxiliary data source for subsequent compositing of video graphics content. Alternatively, only the tracked objects may be rendered, but there are situations where it might be appropriate to occlude all or part of a car based on fixed objects (e.g., going under a sign or bridge). In such situations the occluding features (e.g., signs, bridges) are rendered into the depth map with the tracked objects (vs. the track and other rigid features in the 3D model).

The depth buffer may be distorted (e.g., conceptually copy to a texture on a grid, distort grid coordinates, render grid) using radial distortion coefficient/optical center shift of the tracked camera. A final step in refining the depth buffer is distorting the image to adjust to some of the characteristics of the tracked camera to compensate for real distortion. In one embodiment, this is basically an image warp similar to a pincushion pattern. In alternative embodiments either the depth map or the video image may be distorted depending on subsequent usage needs. As long as the synthetic objects and data are highly accurate, there is accurate pixel coverage and it is possible to overlay the graphics directly on the video and have them registered to produce a cohesive image. The normalized depth data has a mapping to 3D space so that it can be properly registered with the video and only the parts of graphics objects that should not be occluded by objects in the video will be overlaid in the final composition. This happens by associating the depth map and the video imagery together, then inserting any additional features using the depth information to determine which parts are visible.

In practice, there may be artifacts based on the precision of the data or of the models used in the rendering. One potential solution for removing the artifacts to make the integration of synthetic and video content more seamless would be to combine data from the depth map with a video processing routine that does real time image segmentation.

In one embodiment of the present invention, the process involves duplicating the distortion introduced by the video camera's optics. Camera tracking data which supports this system functionality includes pan/tilt/roll, nodal point position (in 3D space), field of view, optical center (in the image plane), and radial distortion coefficient.

Figure 4:
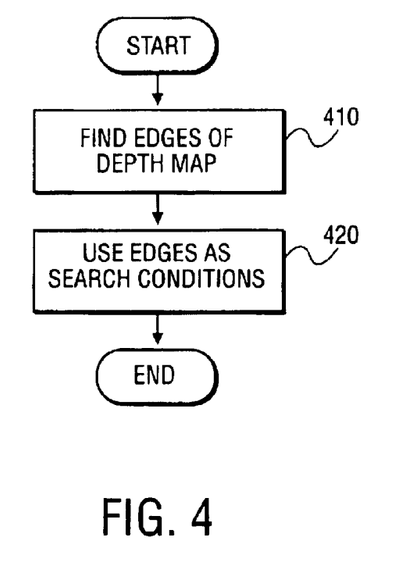
FIG. 4 illustrates a process which may be used in conjunction with the present invention.

FIG. 4 shows one embodiment of a process that may be used in conjunction with the present invention. Referring to FIG. 4, at step 410 the edges in the depth map are found, for example, by using a La Placian filter or by rendering the silhouettes of the models into a third destination.

At step 420, the edges found in step 410 are used as initial conditions for a search in the video image data for edges, because the interest is only in the segmentations that are near these edges. When processing the video data as illustrated in steps 410 and 420, a variety of edge detection processes will work.

Figure 5:
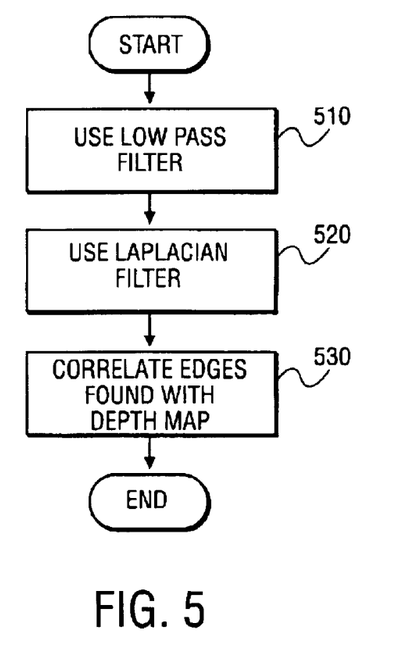
FIG. 5 illustrates an exemplary embodiment of a process which may be used in conjunction with the present invention.

FIG. 5 shows an exemplary process to be used in conjunction with the present invention. Referring to FIG. 5, at step 510, a low-pass filter is used. Such a filter is utilized since the interest is not in high-frequency changes. It is the appropriate filter type because the search is for larger objects. It is readily apparent that other types of filters may also be used.

At step 520, a La Placian operation is used to find edges. This is accomplished by only calculating in the vicinity of edges known to be in the depth map. It is readily apparent that other processes may be used to identify edges.

At step 530, found edges are correlated with the edges of the depth map. Using the found edges as guides, the synthesized depth map is adjusted to expand or contract so as to best fit the found regions. By adapting the depth map appropriately, a more useful depth image is produced.

Using the extracted depth described herein, a variety of processes may be performed. For example, in one embodiment, depth maps extracted from frames of video may be used to composite a virtually created object into the frames of video whereby the proper depth relationships between the video image and the virtually created object are represented in the composited image.

In the foregoing specification, the invention has been described with reference to specific exemplary embodiments thereof. It will, however, be evident that various modifications and changes may be made thereto without departing from the broadest spirit and scope of the invention as set forth in the attendant claims. The specifications and drawings are accordingly to be regarded in an illustrative sense rather than in a restrictive sense.

What is claimed is:

1. A method for generating a depth map used to render objects comprising:
   establishing a virtual camera using camera data of a tracked camera which defines a viewpoint for a synthetic scene, wherein the camera data is generated by a live camera focused on at least part of a live scene corresponding to the synthetic scene;
   setting the field of view of the virtual camera to the field of view of the tracked camera;
   positioning a synthetic tracked object in the scene according to position information of a tracked object;
   embedding the synthetic tracked object into the live scene using depth information stored in the depth map; and
   extracting depth information of the positioned synthetic tracked object to generate depth map.

2. The method as set forth in claim 1, wherein the synthetic scene comprises a three dimensional model of an environment.

3. The method as set forth in claim 1, wherein extracting further comprises extracting depth information of the synthetic scene.

4. The method as set forth in claim 1, wherein the environment comprises a race track.

5. The method as set forth in claim 1, wherein establishing further comprises re-positioning the virtual camera as the tracked camera changes.

6. The method as set forth in claim 1, further comprising animating the synthetic tracked object according to the position and orientation information.

7. The method as set forth in claim 1, further comprising using image segmentation to align the depth map in accordance with real edges in the live scene.

8. The method as set forth in claim 1, wherein camera data is recorded from a camera focused on at least part of a scene corresponding to the synthetic scene, the method further comprising combining the synthetic tracked object with video using depth information stored in the depth map.

9. The method as set forth in claim 1, wherein the depth map is further refined by distorting grid coordinates of the depth map based upon characteristics of the tracked camera which defines the field of view.

10. A system comprising:
    a tracked camera configured to define a viewpoint for a synthetic scene, wherein the tracked camera comprises a live camera and the camera data is generated by the tracked camera focused on at least part of a live scene corresponding to the synthetic scene;
    a virtual camera using camera data of the tracked camera, the field of view of the virtual camera set to the field of view of the tracked camera;
    a synthetic tracked object in the scene positioned according to position information of a tracked object, wherein depth information of the tracked object provides information to generate a depth man; and
    a rendering unit configured to embed the synthetic tracked object into the live scene using depth information stored in the depth map.

11. The system as set forth in claim 10, wherein the synthetic scene comprises a three dimensional model of an environment.

12. The system as set forth in claim 10, wherein the environment comprises a race track.

13. The system as set forth in claim 10, wherein depth information of the synthetic scene further provides information to generate the depth map.

14. The system as set forth in claim 10, wherein the virtual camera is re-positioned to track camera data changes.

15. The system as set forth in claim 10, further comprising an animation unit to animate the synthetic tracked object according to the position and orientation information.

16. The system as set forth in claim 10, wherein the rendering unit is further configured to use image segmentation to define the depth map in accordance with real edges in the live scene.

17. The system as set forth in claim 16, wherein the rendering unit distorts grid coordinates of the depth map based upon characteristics of the tracked camera which defines the field of view.

18. The system as set forth in claim 10, wherein the synthetic scene comprises a three dimensional model of an environment.

19. The system as set forth in claim 10, wherein depth information of the synthetic scene further provides information to generate the depth map.

20. The system as set forth in claim 10, wherein the virtual camera is re-positioned to track camera data changes.

21. A system for generating a depth map used to render synthetic objects comprising:
    a tracked camera configured to define a viewpoint for a synthetic scene, wherein the tracked camera comprises a live camera coupled to the processor and the camera data is generated by the tracked camera focused on at least part of a live scene corresponding to the synthetic scene;

a processor configured to generate a virtual camera using camera data of the tracked camera, the field of view of the virtual camera set to the field of view of the tracked camera and a synthetic tracked object in the scene positioned according to position information of the tracked object, wherein the processor is further configured to embed the synthetic tracked object into the live scene using depth information stored in the depth map; and a depth map of the positioned tracked object.

22. The system as set forth in claim 21, wherein the processor is further configured to animate the tracked synthetic object according to the position and orientation information.

23. The system as set forth in claim 21, wherein the processor is further configured to use image segmentation to define the depth map in accordance with real edges in the live scene.

24. The system as set forth in claim 23, wherein the processor is further configured to distort grid coordinates of the depth map based upon characteristics of the tracked camera which defines the field of view.

25. A computer readable medium comprising instructions, which when executed by a processing system perform a method for generating a depth map used to render objects comprising:

establishing a virtual camera using camera data of a tracked camera which defines a viewpoint for a synthetic scene, wherein the camera data is generated by a live camera focused on at least part of a live scene corresponding to the synthetic scene;

setting the field of view of the virtual camera to the field of view of the tracked camera;

positioning a synthetic tracked object in the scene according to position information of the tracked object;

extracting depth information of the positioned synthetic tracked object to generate a depth map; and embedding the synthetic tracked object into the live scene using depth information stored in the depth map.

26. The computer readable medium as set forth in claim 25, wherein the synthetic scene comprises a three dimensional model of an environment.

27. The computer readable medium as set forth in claim 25, wherein establishing further comprises re-positioning the virtual camera to track camera data changes.

28. The computer readable medium as set forth in claim 25, wherein depth information of the synthetic scene is further used to generate the depth map.

29. The computer readable medium as set forth in claim 25, further comprising animating the tracked synthetic object according to the position and orientation information.

30. The computer readable medium as set forth in claim 25, further comprising using image segmentation to define the depth map in accordance with real edges in the live scene.

31. The computer readable medium as set forth in claim 25, further comprising distorting grid coordinates of the depth map based upon characteristics of the tracked camera which defines the field of view.

* * * * *